US011802931B2

(12) United States Patent
Raul Campos De Oliveira et al.

(10) Patent No.: US 11,802,931 B2
(45) Date of Patent: Oct. 31, 2023

(54) SYSTEM AND METHOD FOR TRACKING MOBILE ASSETS, FIRST NOTICES OF LOSS, TRACKING DEVICE AND CORRESPONDING COMPUTER PROGRAMS

(71) Applicant: Technopartner Rastreamento Eireli—ME, Curitiba (BR)

(72) Inventors: Gibram Raul Campos De Oliveira, Belo Horizonte (BR); Elisio Jose Da Silva Junior, Belo Horizonte (BR); Raul Wolf Pedroso, Curitiba (BR)

(73) Assignee: TECHNOPARTNER RRASTREAMENTO EIRELI—ME

( * ) Notice: Subject to any disclaimer, the term of this patent is extended or adjusted under 35 U.S.C. 154(b) by 0 days.

(21) Appl. No.: 16/761,400

(22) PCT Filed: Nov. 3, 2017

(86) PCT No.: PCT/BR2017/050330
§ 371 (c)(1),
(2) Date: May 4, 2020

(87) PCT Pub. No.: WO2019/084635
PCT Pub. Date: May 9, 2019

(65) Prior Publication Data
US 2021/0003659 A1 Jan. 7, 2021

(51) Int. Cl.
*G01S 5/02* (2010.01)
*G06Q 50/28* (2012.01)

(52) U.S. Cl.
CPC ............ *G01S 5/0231* (2013.01); *G01S 5/021* (2013.01); *G06Q 50/28* (2013.01)

(58) Field of Classification Search
CPC ........ G01S 5/9231; G01S 5/021; G06Q 50/02
USPC ..................................................... 455/456.1
See application file for complete search history.

(56) References Cited

U.S. PATENT DOCUMENTS

| | | | | |
|---|---|---|---|---|
| 7,936,262 | B2* | 5/2011 | Derrick | G08B 21/0269 340/539.13 |
| 8,810,392 | B1* | 8/2014 | Teller | G08B 21/24 340/572.1 |
| 9,997,043 | B2* | 6/2018 | H. Kazerouni | G01S 3/782 |
| 2004/0174264 | A1* | 9/2004 | Reisman | G08B 21/0202 340/573.4 |
| 2005/0068169 | A1* | 3/2005 | Copley | G08B 21/0283 340/539.13 |
| 2008/0174422 | A1* | 7/2008 | Freathy | H04W 4/02 340/539.13 |
| 2011/0221635 | A1 | 9/2011 | Wang | |
| 2017/0164156 | A1* | 6/2017 | Evans | G06F 21/88 |
| 2017/0352250 | A1* | 12/2017 | de Barros Chapiewski | H04W 4/023 |

FOREIGN PATENT DOCUMENTS

WO 2004044606 A2 5/2004
WO 2017083212 A1 5/2017

OTHER PUBLICATIONS

International Search Report issued in PCT/BR2017/050330 dated Apr. 1, 2018.

* cited by examiner

*Primary Examiner* — William Nealon
(74) *Attorney, Agent, or Firm* — Dilworth IP, LLC

(57) ABSTRACT

A system and a method for tracking mobile assets, in which a tracking device is coupled to the mobile asset, the location thereof being determined by a mobile device entering the operating radius of a wave emitted by the tracking device (and/or vice versa), the mobile device having and running at least one computer program for this purpose. The position of the tracking device is refined by detecting a data packet emitted by more than one mobile device within the operating radius of the tracking device, in which communication is established between the tracking device and a server of the system over a network including all of the mobile devices having the computer program for this purpose. A set of first notices of loss that characterize the action situations of the method according to the invention, and finally a corresponding tracking device.

16 Claims, No Drawings

SYSTEM AND METHOD FOR TRACKING MOBILE ASSETS, FIRST NOTICES OF LOSS, TRACKING DEVICE AND CORRESPONDING COMPUTER PROGRAMS

FIELD OF THE INVENTION

The present invention pertains to the field of wireless communication networks and locating objects by means of waves.

INTRODUCTION

The present invention relates to a system and a method for tracking mobile assets, in which a tracking device is coupled to the mobile asset, the location thereof being determined by a mobile device entering the operating radius of a wave emitted by the tracking device (and/or vice versa), said mobile device having and running at least one computer program for this purpose. The position of the tracking device is refined by detecting a data packet emitted by more than one mobile device within the operating radius of the tracking device, in which communication is established between the tracking device and a server of said system over a network comprising all of the mobile devices having the computer program for this purpose.

Furthermore, the present invention relates to a set of first notices of loss that characterize the action situations of the method according to the invention, and finally a corresponding tracking device.

BACKGROUND OF THE INVENTION

Solutions for tracking mobile assets through wireless devices include a number of technologies, the most commonly used being based on five widely spread technologies.

The first of these technologies is satellite tracking, wherein the reception and sending of data is done exclusively by a GPS modem. Although it is highly flexible, features a relatively low infrastructure cost (as it makes use of satellite constellations already in orbit), and can be applied to almost any object, enabling position information to be sent regardless of the presence of another telecommunication network signal (GSM, for example), operational and tracking device costs are relatively high, in addition to being susceptible to jammers and not being an autonomous system when employed in vehicle tracking given the high power consumption of the GPS modem.

The second important technology for this description is that which combines Global Positioning System (GPS) and Global System for Mobile communication (GSM), wherein signal reception is performed by GPS and sending data collected by GSM. It is also a flexible system with high availability of service providers and equipment suppliers, and it is possible to add important additional information to tracking, such as, detecting and analyzing the movement behavior of the object to be tracked in relation to the user registered for this object (driver behavior). Its total cost, however, is equally high and its operation is also susceptible to jammer interference, and tracking device is not autonomous, given the high power consumption of GPS and GSM modems present in the devices.

The third most popular technology is Location-Based System (LBS), which performs geolocation by triangulation between GSM antennas and sends data collected via GSM. Although equipment and infrastructure are very affordable, operational costs, risk of jamming by jammers, lack of autonomy, and especially poor accuracy of position information are the main disadvantages of this solution.

The fourth important form of tracking is radio frequency (RF) tracking, which performs tracking by means of antennas at a particular frequency with a specific communication protocol. The equipment can be standalone and have relatively low costs of acquisition and operation, but require a costly infrastructure. Even though they make it possible to form a network between devices (mesh network), susceptibility to jammers and inaccuracy of position information are the main disadvantages of this technology.

The fifth and last technology that should be mentioned for understanding the present invention is hybrid technology which comprises the simultaneous use of GPS, GSM and RF technologies. In this technology the positioning of the tracking device is primarily done by GPS, and the sending of geolocation data is performed by GSM. As a redundancy for sending the collected data, the device also acts through antennas operating at a particular radio frequency. This technology allows for ways of countering the use of jammers, the device being capable of operating in networks (mesh network) and detection of specific conditions of the tracked object (driver behavior). The main disadvantage, however, is the high overall operational and equipment and infrastructure costs, and the fact that the equipment energy consumption prevents it from being autonomous.

STATE OF THE ART

A wide variety of solutions for tracking mobile targets using wireless technologies are available in the state of the art.

An example is patent document US20160142868 which refers to a system in which communication between its components occurs exclusively through low energy wave devices such as Bluetooth Low Energy (BLE) devices. These solutions base tracking on four basic components, namely (i) a POI (point of interest), (ii) a Leaf Node associated to at least one POI and receiving data from these POIs, (iii) a Reader Node receiving data from multiple Leaf Nodes and (iv) a Cloud Server receiving data from Reader Nodes. This system uses the known position of several POIs to determine, by crossing positions stored in a database, and positioning of a Leaf Node (device with the location sought). In addition, if a given Leaf Node is not within range of a POI that has a particular position, the Leaf Node position can be determined by crossing information from known Read Node coordinates.

The main disadvantage of the solution from US20160142868 lies in the fact that it requires the existence of points of interest (POI) with predetermined locations in order to locate the Leaf Node. Another disadvantage is the need for two devices—the point of interest (POI) and the Reader Node—between the Leaf Node and the server for sending position information.

Another document of the state of the art related to the present invention is represented by patent document KR101580416, which describes a system for tracking a stolen vehicle. The proposed solution defines a system combining a mobile terminal containing an application (APP) to track stolen vehicles, a police server, and a BLE tag attached to the vehicle. Besides the limitation of being conditional to an official (police) server, flexibility and access being therefore independent of the solution provider, there is the limit imposed by a specific application (APP). No mention is made of how vehicle theft communication occurs to the server, only that after the theft alert, the stolen vehicle ID is transmitted to smartphones so that its specific ID can be searched. Finally, as in the case of US20160142868 described above, the solution of document KR101580416 depends on the presence of fixed Radio Base Stations, with known geolocation.

Another known state of the art solution is the system and method for tracking items in defined areas disclosed by the patent document US20170142549, which comprises a device (called a tag) emitting beacons using bluetooth, a bridge represented by a second device that determines the region to be scanned, which reads this beacon indicating that the bridge is in the same operating radius of the tag emitting beacons via bluetooth. When the beacon is read, the bridge positioning is indicated as the approximate positioning of the tag. A server receives the data packet from the device and adds or updates the tag position, while a database is used to store the data packet received by the server. In addition, there is also a system for querying the position of the tag stored in the database for the user.

The US20170142549 system and method has some apparent disadvantages: the wireless bridge is represented by a second device that has the function of reading beacons and communicating with the server using a WiFi network, i.e. there are limitations in terms of tracking capillarity, with triangulation being restricted to predetermined device and, in particular, to a predetermined area.

As may be inferred from the foregoing descriptions, there is room for a tracking system and method that overcomes the shortcomings of the prior art described above, being in particular:

a) independent of a specific set location to perform the tracking;
b) independent of devices having known position and/or location;
c) capable of utilizing the capillarity of a pre-existing network without incurring additional infrastructure costs to operate;
d) capable of allowing monitoring and evaluation of asset behavior under specific parameters;
e) have initial robbery/theft detection strategies; and
f) enable mesh networking between tracking device.

OBJECTIVES OF THE INVENTION

One of the objectives of this invention is, therefore, to provide a system and method of tracking mobile assets, in which a tracking device according to the invention is coupled to the mobile asset, its location being determined either by penetration, in the radius of action of a wave emitted by the tracking device, of a mobile device having and running at least one computer program for such purpose, or by penetration of the tracking device in the radius of action of the mobile device.

The position of the tracking device is refined with the detection of a data packet emitted by more than one mobile device within the operating radius of the tracking device, wherein the RSSI (Received Signal Strength Indicator) can be taken into account, in which communication is established between the tracking device and a server of said system over a network comprising all mobile devices having the computer program for this purpose.

Action situations are triggered by first notices of loss in accordance with the invention.

DETAILED DESCRIPTION OF THE INVENTION

System

A system according to the invention is a mobile asset tracking system comprising:

1. A mobile asset to be tracked;
2. A tracking device;
3. One or more mobile devices;
4. A computer program associated to the mobile device;
5. A remote server; and
6. A computer program associated to the remote server.

The movable asset to be tracked can be any vehicle, but it can also be a person, object or the like capable of moving by itself or being moved by a third party.

The tracking device is a device physically associated to the mobile asset in order to accompany it permanently, basically being equipped with at least one electronic circuit and at least one transmitter/receiver, the latter being a specific signal emitting device such as a BLE device (Bluetooth Low Energy) or the like suitable and operating with reduced dimensions and low energy consumption.

As the tracking device should be independent of the wiring of the vehicle to be tracked, it should be provided with its own highly autonomous power source (hereafter only battery), remaining active without interruption, without battery-saving hibernation, which is a usual behavior in radio frequency tracking device.

In addition, the tracking device according to the invention may also be provided with special devices such as an accelerometer, a gyroscope and other related devices to enable data and information to be obtained from the tracking device.

According to the invention, the tracking device is provided with an installation status checking device, indicating an installed status related to installation or disposition (or approach) in the mobile asset, an activated status related to activation and start of service and, finally, an uninstallation status reporting any uninstall or removal or separation of the mobile asset tracking device.

This installation status checking device may be a mechanical and/or electrical and/or electronic device, i.e. any device being capable of detecting and allowing any other device to read the installation status of the tracking device.

The mobile device may be any mobile device such as a suitable mobile phone or smartphone or tablet device or the like, the term "mobile device" herein being understood to be one or more mobile devices capable of participating in the formation of a mobile device network.

The computer program associated to the mobile device is a program executable by the mobile device, so that each mobile device can serve as both an antenna for the tracking device as well as a transmitter of information received from tracking device to the remote server, including in the communication packet, multiple information, such as the GPS position of the mobile device and other similar appropriate information.

The computer program associated to the mobile device has an architecture capable of minimizing as much as possible the use of the mobile device GPS for determination of vehicle positioning, contemplating an adaptive strategy that verifies the need to update the antenna position. If in two consecutive readings the GPS position remains unchanged or slightly varied, the time between the first reading and the next reading will be increased. Otherwise, the reading frequency is increased.

The computer program associated to the mobile device detects the positioning of the mobile device, as well as the GPS modem itself, by detecting suitable WiFi or similar networks and by searching specific databases, for example Google Street View or the like and suitable, for the latitude and longitude of these networks.

In order to avoid over-consumption of data from a particular mobile device, the collected data is stored in the mobile device's database once a certain level of data is consumed and is only sent to the server after the mobile device has been connected to a suitable WiFi network or similar.

The computer program associated to the mobile device also checks the battery status of the mobile device. In normal state of network operation, if the mobile device battery is below a certain level, the BLE activation and GPS activation of the mobile device is decreased to a minimum, still acceptable for operation. If the driver is charging the battery, contrary to the previous behavior, BLE and GPS activation is amplified to take advantage of the continuous power supply to the mobile device.

The computer program associated to the mobile device also has an emergency mode within the mobile device network. In case of detection or communication of robbery/theft of a certain tracking device ID, from the zero mark (location of last position of the device received by the system), the network of mobile devices with at least one application having the computer program associated to the mobile device hosted in a certain radius around this location, starts to behave differently. The computer program associated to the mobile device scales up bluetooth of these mobile devices to make it easier to search and read this ID. The radius is progressively increased until tracking device is found. If the desired ID is read, the radius of the emergency state is again adapted by the system, which prevents excessive battery use of mobile devices in a given region. Mobile devices that detect the searched ID will also use GPS in a scaled up or permanent status, returning to the normal state when the ID is no longer detected by BLE.

The remote server is a central server comprising processing and database and is responsible for system management and may be one or more servers, in a cloud or in suitable specific or similar locations.

The computer program associated to the remote network is a program that is executable by the remote server and is responsible for managing the entire system and the database, as well as processing information, and writing and reading information from all system components.

Method

A method according to the invention is a method performed by a system according to the invention, wherein the system comprises a mobile asset to be tracked, a tracking device, one or more mobile devices, a computer program associated to the mobile device, a remote server and a computer program associated to the remote server.

A method according to the invention comprises the following method steps:
1. Couple the tracking device to the movable property;
2. Trigger the installed status and activated status of the tracking device;
3. Send tracking device data packets via BLE;
4. Request mobile devices to search for data packets sent by tracking device;
5a. Have one or more mobile devices (antennas) permeating the BLE range of the tracking device, receiving the data packet in the system protocol; or
5b. Have one or more tracking device permeating the BLE range of a given mobile device (antenna);
6. Enrich data packets sent by the tracking device with information from the mobile device and send the enriched data packets to the remote server;
7. Receive via remote server and store the enriched data packets in the database;
8. Read and process the data received for use in the mobile asset tracking operation;
9. Once the action situation has been established, send to mobile devices a command to scale up BLE scanning and GPS positioning within a predetermined and editable radius around a zero mark (last known position of the tracking device sought), defining a zone of scaled up behavior; and
10. Constantly review the zone of scaled up behavior, this zone being maintained, expanded, reduced or repositioned depending on whether information has been received from the tracking device sought or not.

Thanks to its small size, the tracking device can be placed in the mobile asset to be tracked in inaccessible locations and/or where sighting of the tracker is difficult, such as inside columns of the car body or inside the motorcycle chassis.

Triggering the installation status checker from the tracking device interrupts a hibernation state of the tracker firmware, which was the status imposed on the tracker after its final test on the line in which it was manufactured.

The firmware of the device can also have its hibernation interrupted by command from the computer program installed in a mobile device belonging to the network or through a given behavior that characterizes its installation in the property to be tracked, such as acceleration profiles.

In the new status, namely the production status, the firmware now sends, via BLE, at a predefined and editable frequency, device data packets that include device ID (unique device identifier), device battery voltage, installation status verifier status, accelerometer and gyroscope sensor data, and date and time.

A randomly arranged antenna network consisting of a plurality of mobile devices such as smartphones, tablets and the like having at least one computer program associated to a mobile in the form of, for example, an application associated with an SDK (fraction of computer program code) installed. Mobile devices may have internet access via the mobile phone network (2G, 3G, 4G) or WiFi.

The SDK requests mobile devices to search, via BLE, for data packets sent by the tracking device.

One or more antennas permeate the BLE range of the tracking device, receiving the data packet in the system protocol. The opposite is also possible wherein one or more tracking device permeates the BLE range of a given antenna.

Data packets sent by the tracking device are enriched by the SDK with battery voltage, battery charge status, GPS position and ID of the reading mobile device and are then sent to the remote server via the internet.

The remote server receives the sent data packets and stores them in the database.

A computer program associated to the remote server reads data received for use in the mobile asset tracking operation.

Once an action situation has been established, i.e. once a theft or robbery of the tracked asset has been received, which may occur through one of the channels of communication with a tracking company and/or through one or more First Notices of Loss (FNOL) and/or similar, a command to scale up scan via BLE and GPS positioning to a pre-determined and editable radius around the zero mark (last known position of the tracking device sought), defining a scaled up behavior zone, is sent to the antenna network (mobile devices).

This scaled up behavior zone of antennas is constantly revised, being maintained, expanded, reduced or repositioned as a function of receiving or not receiving information from the tracking device sought. This feature of the tracking system prevents mobile devices present in a given area from experiencing high battery consumption for long periods due to searching for tracking device in action.

First Notices of Loss (FNOL)

Action situations that trigger scaled up behavior can therefore be triggered either by a monitoring center and/or police force and/or similar or, and mainly, by the First Notices of Loss, or FNOL.

The first notices of loss according to the invention include the following activation options:

1. Checking of installation status of tracking device; and/or
2. Comparison of tracking device acceleration to linked mobile devices; and/or
3. Comparison of tracking device position to linked mobile devices; and/or
4. Path and theft/robbery heat zones checking; and/or
5. Comparison of driver(s) behavior; and/or
6. Lack of communication with tracking device; and/or
7. Detection of operation zone of a jammer and disappearance of tracking device.

The first FNOL or FNOL 1 depends on checking the installation status of the tracking device. After the installation status checker has been activated (when the firmware goes out of hibernation) FNOL 1 comprises the following steps:

i. In the new status, namely the production state, the firmware now sends, via BLE, at a predefined and editable frequency, device data packets that include, among other information, the status of the installation status checker;

ii. If the device is removed from where it was installed, the installation status checker will switch from triggered to non-triggered or uninstalled status;

iii. When a system antenna, represented by a mobile device with at least one APP (application) associated to the computer program code fraction (SDK) installed, receives a packet from the tracking device that has been uninstalled, information from the checking device about disabled installation status is sent via the internet to the remote server;

iv. The remote server updates the information received from the installation status of the tracking device in the database; and v. The tracking computer program receives the alert upon status update of the tracking device installation status checker from installed to uninstalled, and posts the device ID to a list of devices in an emergency status (possible theft/robbery).

FNOL 2 is based on comparing tracking device acceleration to linked mobile devices, comprising the following steps:

i. At the time of installation, which can be guided by a tutorial from the APP, of the tracking device to the property to be tracked, main and eventual drivers unique mobile device IDs is captured by the SDK associated to the APP;

ii. The capture of main and eventual drivers mobile device IDs, which will be considered by the tracking system as main antennas for transmitting the data sent by the tracking device coupled to the tracked property of these drivers, is performed, for example, by reading the IMEI or MAC of the mobile devices, upon login to the APP having the SDK, and then sending this information to the tracking system database. Another way of capturing the mobile device IDs, for example, is the installation of a token (electronic key) by the application in the APP repertoire that has the SDK in these devices during the process of installing the tracking device, making them identifiable and unique to the system. A third example for capture of mobile device IDs is sending to registered phone numbers an SMS (Short Message Service) with a confirmation code. Once the correct code in the APP that has the SDK has been entered, it reads the IMEI or MAC of mobile devices and sends them to the tracking system database;

iii. The main and eventual driver mobile device IDs and tracking device stored in the system database are permanently linked, allowing the accelerations of these devices to be constantly compared;

iv. If the tracking device experiences accelerations incompatible with the mobile devices linked to it, the system enters the tracking device ID to a list of devices in a potential emergency (likely theft or robbery), as the tracked property is possibly being conducted by someone else;

v. This FNOL makes it so that even if tracking device packets are still being read by one or more linked mobile devices, a possible vehicle theft or robbery is automatically identified by the tracking system because of the difference in measured accelerations; and vi. If any of the mobile devices linked to the tracking device are inaccessible, for example, due to lack of battery or signal from the mobile data network (2G, 3G, 4G), this information is added to the possible theft or robbery alert on the tracking system.

FNOL 3, in turn, compares the position of tracking device to linked mobile devices, which comprises the following steps:

i. At the time of installation, which can be guided by a tutorial from the APP, of the tracking device to the property to be tracked, main and eventual drivers unique mobile device IDs is captured by the SDK associated to the APP;

ii. The capture of main and eventual drivers mobile device IDs, which will be considered as main antennas by the tracking system for transmitting the data sent by the tracking device coupled to the tracked property of these drivers, is performed, for example, by reading the IMEI or MAC of the mobile devices, upon login to the APP having the SDK, and then sending this information to the tracking system database. Another way of capturing the mobile device IDs, for example, is the installation of a token (electronic key) by the application in the APP repertoire that has the SDK in these devices during the process of installing the tracking device, making them identifiable and unique to the system. A third example for capture of mobile device IDs is sending to registered phone numbers an SMS (Short Message Service) with a confirmation code. Once the correct code in the APP that has the SDK has been entered, it reads the IMEI or MAC of mobile devices and sends them to the tracking system database;

iii. The main and eventual driver mobile device IDs and tracking device stored in the system database are permanently linked, allowing the accelerations of these devices to be constantly compared;

iv. If the tracking device moves through the antenna network and has its position updated, and the new position is different from the position of the mobile devices linked to it, the system enters the tracking device ID to a list of devices in a potential emergency (likely theft or robbery), as the tracked property is possibly being conducted by someone else; and v. If any of the mobile devices linked to the tracking device are inaccessible, for example, due to lack of battery or signal from the mobile data network (2G, 3G, 4G), this information is added to the possible theft or robbery alert on the tracking system.

FNOL 4 is based on path verification and theft/robbery heat zones and comprises:

i. Through the zero marks (history of positions where reports of theft/robbery have occurred), the tracking system tracks theft/robbery concentration points (heat zones);

ii. The system also tracks, from the zero markers, the paths normally taken by reported theft/robbery tracking device; and iii. If, after passing through a heat zone, the tracking device takes a path normally taken after theft/robbery, the tracking device ID is entered in a list of devices in a potential emergency (likely theft or robbery).

FNOL 5 makes a comparison of driving behavior or driver behavior of the driver (s), comprising the following steps:

i. Through the accelerometer and gyroscope present in the tracking device electronics, plus the paths, times and speeds normally verified by the tracking system for each day of the week, a driver behavior is learned for each driver of the tracked property;

ii. If the driver behavior verified by the system differs from that usual to a particular driver, the system includes the tracking device ID a list of devices in a potential emergency (likely theft or robbery); and iii. If any of the mobile devices linked to the tracking device is inaccessible, for example, due to lack of battery or signal from the mobile data network (2G, 3G, 4G), this information is added to the possible theft or robbery alert on the tracking system.

FNOL 6, on the other hand, operates based on lack of communication to a tracking device, acting in a sequence that includes the following steps:

i. The tracking system monitors the elapsed time of the last communication of a given tracking device; and ii. If the non-communication time of a particular tracking device exceeds a stipulated value, the tracking device ID is automatically included in a list of devices in a potential emergency (likely theft or robbery).

Finally, FNOL 7 depends on detecting the operation zone of a signal blocker or jammer and disappearance of the tracking device. Jammers are devices commonly used by gangs that specialize in theft and robbery of vehicles and cargo, that block GPS, WiFi, Bluetooth and mobile data network (2G, 3G, 4G) communication from any device within range. The FNOL 7 steps comprise:

i. The SDK, associated with at least one APP installed on mobile devices, constantly monitors the reception of data from GPS, WiFi, Bluetooth and the mobile data network (2G, 3G, 4G);

ii. If a simultaneous difficulty is detected in receiving or sending data via a mobile device, the SDK, after re-establishing communication with the internet via mobile data network or WiFi, sends an alert to the system, informing the time and GPS position of start and end of the difficulty in receiving data simultaneously from GPS, WiFi networks, Bluetooth and mobile data network (2G, 3G, 4G); and iii. If tracking device disappears in the region where the tracking system has detected the presence of a jammer by the behavior described above, the tracking device ID is included in a list of devices in a potential emergency (probable theft or robbery).

Tracking Device

A tracking device according to the present invention is a device of a system according to the invention for performing a method according to the invention, being physically associated with the movable asset to permanently accompany it, comprising:

a. At least one electronic circuit;
b. At least one transmitter/receiver;
c. At least one power source;
d. At least one automatic installation status detection device;
e. Eventually at least one accelerometer; and
f. Eventually at least one gyroscope.

Computer Programs

A computer program according to this invention is a computer program associated with one or more mobile devices for composing a system according to the invention and for performing a method according to the invention.

Another computer program according to the present invention is a computer program associated with a remote server for composing a system according to the invention and for performing a method according to the invention.

Advantages and Additional Descriptions

The system, method, first loss notices (FNOL), tracking device, and computer programs in accordance with the present invention allow for tracking of mobile assets via tracking device, wherein the positioning of this tracking device is unknown.

The solution proposed here uses one or more independent servers, which can be hosted on a cloud.

Another important difference from the state of the art is the ability to turn any mobile device into an antenna capable of detecting and receiving tracking device information.

Moreover, in the solution according to the invention, mobile antennas will allow for detection of the approximate location of the vehicle even when underground, for three reasons:

a. Permeability of the BLE signal, allowing the beacon sent by the tracking device to be read by nearby cell phones, but in the open;

b. Underground reading of the beacon sent by the tracking device by a smartphone present underground, storage in the APP database that owns the SDK, and, once the smartphone is in the open again, reading of the GPS and sending the data to the server via WiFi or 3G/4G network; and c. Underground reading of the beacon sent by the tracking device by a smartphone underground, storage in the APP database that has the SDK, and once the smartphone is connected to a WiFi network geo-located by Google Street View, determination of an approximate vehicle position even without 3G/4G network availability and/or GPS signal.

The tracking device is small thanks to the low consumption of Bluetooth Low Energy (BLE) technology.

Identification of a likely driver, in the case of a vehicle, is possible by identifying the mobile device (smartphone, for example) that is reading the packets sent by the tracking device. Since smartphones are now individualized, personal devices, this interpretation is sufficiently accurate.

Some monitoring/tracking companies are carrying out vehicle tracking and driver profile detection exclusively via smartphone. However, without a tracking device detected by the smartphone and coupled to the vehicle, it is not possible to confirm whether or not the smartphone is in the vehicle to be tracked. In addition, the driver profile is impaired as it is not possible to confirm whether the smartphone owner is hitchhiking with someone or on public transport or a taxi. Another problem is that the accelerometer of the smartphone when used to detect a driver profile is not necessarily coupled to the vehicle. This can generate the measurement of accelerations from the smartphone's movement in the vehicle if it is let loose in its interior.

BLE also allows for tracking device to send at high frequency (about three times per second) a data packet containing basically the device ID, battery voltage, firmware version, authentication packet, installation checker status and acceleration measured on the device, increasing the chance of being read by the network, even at high travel speeds. This is a big problem with pure RF equipment, as it opens the communication channel at a very low frequency (for example, once every 10 minutes) to decrease battery power consumption. In the interval between each communication channel opening, RF equipment normally hibernates, unable to be detected or to receive commands.

The presence of an integrated accelerometer and gyroscope in the tracking device electronics allows for tilt and acceleration data to be sent to the server, which will be used for profiling usage, accident reconstitution and automated theft/robbery detection.

Usage profiling: These profiles will be constantly updated with the collected data and can be used by insurers for insurance pricing without prior stereotypes and for offering new products, such as pay-as-you-drive, where the insured will only be charged for the days wherein the insured property is used.

Accident reconstitution: The tracking device will have a memory that will store 30 to 60 seconds of acceleration and body position data collected at a very high frequency (much higher than that sent by the data packet). If a predetermined event in the firmware occurs, such as acceleration above a certain level associated with a gyroscope behavior, this data is recorded and no longer overwritten. As soon as possible, this data is sent to the server by an antenna for detailed recording of the last seconds before the crash.

Automated theft/robbery detection: Device accelerometer data will be constantly compared to smartphone accelerometer data owned by the drivers of the insured vehicle. These drivers will be indicated when the tracking device is activated. If it is detected that the tracking device is in motion, but none of the registered smartphones have compatible acceleration, a notification will be sent. A call from the call center is also possible to confirm if something is wrong.

CONCLUSION

The present invention, therefore, provides system, method, first notices of loss (FNOL), tracking device and computer programs according to the aforementioned dimensions and characteristics, which will augment in a new and inventive way the solutions for problems of the state of the art of vehicle tracking.

FINAL CONSIDERATIONS

It will be easily understood by those skilled in the art that changes can be made to the present invention without departing from the concepts exposed in the above description. These modifications must be regarded as included in the scope of the present invention. Consequently, the particular embodiments detailed above are only illustrative and exemplary and are non-restrictive as to the scope of the present invention, to which the full extent of the appended set of claims, and any and all correspondents thereof, must be observed.

The invention claimed is:

1. A mobile asset tracking system, comprising:
   at least one mobile asset to be tracked, wherein the mobile asset to be tracked is a vehicle,
   at least one tracking device physically coupled to the at least one mobile asset in order to permanently accompany the mobile asset, wherein the at least one tracking device includes an accelerometer, wherein said tracking device is associated with a tracking device ID,
   one or more mobile devices, a first mobile device of the one or more mobile devices being linked to the at least one tracking device,
   at least one first computer program associated with the one or more mobile devices,
   at least one remote server, and
   at least one second computer program associated with the at least one remote server,
   wherein a location of the at least one tracking device is determined either by penetration, in a radius of action of a wave emitted by the at least one tracking device, of at least one of the one or more mobile devices having and running the at least first one computer program for such purpose, or by penetration of the at least one tracking device in a radius of action of at least one of the one or more mobile devices, wherein communication is established between the at least one tracking device and the at least one remote server over a network comprising all of the one or more mobile devices having the at least one first computer program, and
   wherein the determination of the location of the tracking device is independent of any predefined location information of the at least one tracking device and the one or more mobile devices,
   wherein the system is configured to compare an acceleration of the at least one tracking device to an acceleration of the first mobile device and identify a loss of the at least one mobile asset in response to the acceleration of the at least one tracking device being incompatible with the acceleration of the first mobile device, and
   wherein the system defines a zone of scaled up behavior around a zero mark region when an action situation is established, wherein the zone of scaled up behavior is constantly reviewed, the zone of scaled up behavior being maintained, expanded, reduced or repositioned depending on whether information has been received from the tracking device sought or not.

2. A mobile asset tracking method, characterized in that it is performed by means of a system according to claim 1, comprising steps of:
   physically couple the tracking device to the at least one mobile asset in a permanent manner, wherein the mobile asset to be tracked is the vehicle;
   trigger checking of an installation status of the tracking device by an installation status checking device, the installation status checking device being a mechanical, electrical, and/or electronic device capable of detecting the installation status of the tracking device, or by motion checking by tracking device firmware;

send data packets from the tracking device via a Bluetooth Low Energy (BLE);
request the one or more mobile devices to search for the data packets sent by the tracking device;
have at least one of the one or more mobile devices permeating a BLE range of the tracking device and receiving the data packet in a system protocol, or have the tracking device permeating a BLE range of at least one of the one or more mobile devices;
enrich the data packets sent by the tracking device with information from the one or more mobile devices and send the enriched data packets to the remote server;
receive via the remote server and store the enriched data packets in a database;
read and process the enriched data packets received for use in a mobile asset tracking operation;
send to the one or more mobile devices, once an action situation has been established, a command to scale up BLE scanning and GPS positioning within a predetermined and editable radius around a zero mark being a last known position of the tracking device sought, defining the zone of scaled up behavior; and
constantly review the zone of scaled up behavior, the zone of scaled up behavior being maintained, expanded, reduced or repositioned depending on whether information has been received from the tracking device sought or not.

3. The method according to claim 2, characterized in that the action situations trigger the scaling up of behavior and may be activated either by at least one of a monitoring center or by police force.

4. The system according to claim 1, wherein the system is further configured to identify a loss of the at least one mobile asset in response to:
checking of an installation status of the tracking device;
comparison of a tracking device position to linked mobile devices;
path and theft/robbery heat zones checking;
comparison of a driver(s) behavior;
a lack of communication with the tracking device; or
detection of an operation zone of a jammer and a disappearance of the tracking device.

5. A tracking device, being a device of the system according to claim 1, comprising at least one electronic circuit, at least one transmitter/receiver, at least one installation status checking device, and at least one power source.

6. A mobile device having a computer program stored thereon, characterized in that the computer program is associated with the one or more mobile devices and/or the remote server for performing the method according to claim 3.

7. The mobile device according to claim 6, characterized in that the computer program is executable by the mobile device so that each mobile device can serve both as an antenna for the tracking device and as a transmitter of the information received from the tracking device to the remote server, wherein the enriched data packets include a plurality of information including a GPS position of the mobile device.

8. The method according to claim 2, wherein a first notification of loss (FNOL) triggers the scaled up behavior action situation, characterized in that the FNOL comprises at least one of the following activation options:
checking of an installation status of the tracking device;
comparison of a tracking device acceleration to linked mobile devices;
comparison of a tracking device position to linked mobile devices;
path and theft/robbery heat zones checking;
comparison of a driver(s) behavior;
determine a lack of communication with the tracking device; or
detection of an operation zone of a jammer and a disappearance of the tracking device.

9. The system according to claim 1, wherein the at least one tracking device includes at least one electronic circuit, at least one transmitter/receiver, and at least one power source.

10. The system according to claim 9, wherein the at least one tracking device includes a mechanical, electrical, and/or electronic device capable of detecting an installation status of the tracking device.

11. The system according to claim 1, wherein the one or more mobile devices comprise a non-transitory memory storing computer program instructions that when executed by a processor cause the respective mobile device to serve both as an antenna for the tracking device and as a transmitter of data packets received from the tracking device to the remote server, wherein the data packets include a GPS position of the respective mobile device.

12. The system according to claim 1, wherein the system is further configured to compare the location of the at least one tracking device to a location of the first mobile device and identify the loss of the at least one mobile asset in response to the location of the at least one tracking device being incompatible with the location of the first mobile device.

13. The system according to claim 1, wherein the system is further configured to learn a first driver behavior associated a user of the first mobile device including paths, times, and speeds normally identified by the at least tracking device when the vehicle is driven by the user, compare the first driver behavior with a second driver behavior being identified by the at least one tracking device, and identify the loss of the vehicle in response to the second driver behavior being incompatible with the first driver behavior.

14. The system according to claim 1, characterized in that at least one tracking device further includes a gyroscope,
wherein the system creates a driver behavior for each driver of the mobile asset to be tracked using the accelerometer and gyroscope of the system, plus paths, times and speeds normally verified by the tracking system for each day of a week,
wherein the system includes the tracking device ID in a list of devices in a potential emergency in cases when the driver behavior verified by the system differs from that usual to a particular driver, and
when the driver behavior verified by the system differs from that usual to a particular driver, an information regarding said difference is added to a possible theft or robbery alert on the tracking system when any of the mobile devices linked to the tracking device is inaccessible.

15. The system according to claim 1, wherein the tracking device is physically coupled in an inaccessible location of the vehicle.

16. The system according to claim 15, wherein the tracking device is in a column of a body or in a chassis of the vehicle.

* * * * *

UNITED STATES PATENT AND TRADEMARK OFFICE
CERTIFICATE OF CORRECTION

| | | |
|---|---|---|
| PATENT NO. | : 11,802,931 B2 | Page 1 of 1 |
| APPLICATION NO. | : 16/761400 | |
| DATED | : October 31, 2023 | |
| INVENTOR(S) | : Gibram Raul Campos De Oliveira, Elisio Jose Da Silva Junior and Raul Wolf Pedroso | |

It is certified that error appears in the above-identified patent and that said Letters Patent is hereby corrected as shown below:

On the Title Page

At item (73), 'RRASTREAMENTO' should be corrected to read --RASTREAMENTO--.

Signed and Sealed this
Twentieth Day of February, 2024

Katherine Kelly Vidal
*Director of the United States Patent and Trademark Office*